United States Patent [19]

Sloterdijk et al.

[11] 4,317,800

[45] Mar. 2, 1982

[54] PROCESS FOR SIMULTANEOUSLY PROCESSING OF USED METAL AND/OR METAL SCRAP AND SCRAP CONTAINING HALOGENATED HYDROCARBONS

[75] Inventors: Wijtze Sloterdijk; Gerrit Dapper; Cornelis A. Verbraak, all of Enschede; Willem Kirchner, Geleen, all of Netherlands

[73] Assignee: Esmil B.V., Amersfoort, Netherlands

[21] Appl. No.: 187,406

[22] Filed: Sep. 15, 1980

Related U.S. Application Data

[63] Continuation-in-part of Ser. No. 948,646, Oct. 4, 1978, abandoned.

[30] Foreign Application Priority Data

Oct. 5, 1977 [NL] Netherlands .......................... 7710901

[51] Int. Cl.³ .......................... C10B 47/00; C01B 9/00
[52] U.S. Cl. ......................... 423/1; 423/491; 423/497; 423/493; 423/494; 423/481; 201/2.5; 201/15; 201/30
[58] Field of Search .................. 423/44, 60, 75, 76, 423/96, 97, 107, 149, 491–494, 481; 75/111, 43 S, 63, 64; 201/15, 30, 2.5

[56] References Cited

U.S. PATENT DOCUMENTS

| 2,946,668 | 2/1972 | Richelson | 201/15 |
|---|---|---|---|
| 3,615,357 | 10/1971 | Wainer | 75/64 |
| 3,639,111 | 2/1972 | Brink | 423/493 |
| 3,935,293 | 1/1976 | Tsirigotis | 423/493 |
| 4,052,265 | 10/1977 | Kemp | 201/15 |
| 4,222,823 | 9/1980 | Wickbold | 201/2.5 |
| 4,234,388 | 11/1980 | Mallan | 201/2.5 |

FOREIGN PATENT DOCUMENTS

| 2006177 | 5/1979 | United Kingdom | 423/491 |
|---|---|---|---|
| 2008613 | 6/1979 | United Kingdom | 201/2.5 |

Primary Examiner—Brian E. Hearn
Attorney, Agent, or Firm—Cushman, Darby & Cushman

[57] ABSTRACT

A process for reducing environmental pollution resulting from disposal of waste containing halogenated hydrocarbons by simultaneous treatment with used metal and/or metal scrap at elevated temperatures. The halogenated hydrocarbons are pyrolyzed and the resulting hydrogen halide containing gas is brought into contact with the used metal and/or metal scrap at elevated temperatures so as to form metal halogenides that are volatile under the conditions applied. The volatile metal halogenides are largely separated from the gaseous mixture formed, and at least part of the remaining gaseous mixture and/or hydrocarbon residue is used as fuel to maintain the required temperature. The waste feed compositions and process conditions can be chosen to effect separation between various metals by selective halogenation and condensation, and substantially all of the hydrogen halide can be tied up and recovered as metal halogenides.

13 Claims, 2 Drawing Figures

PROCESS FOR SIMULTANEOUSLY PROCESSING OF USED METAL AND/OR METAL SCRAP AND SCRAP CONTAINING HALOGENATED HYDROCARBONS

This application is a continuation-in-part of Ser. No. 948,646 filed Oct. 4, 1978, now abandoned.

BACKGROUND OF THE INVENTION

The invention relates to a process for treating used metal and/or metal scrap and waste containing halogenated hydrocarbons simultaneously and at elevated temperatures, in which process part of the metal and/or metal scrap is converted into metal halogenides that are volatile under the conditions applied.

The disposal or processing of waste material containing halogenated hydrocarbons, particularly chlorinated and, to a lesser extent, the fluorinated hydrocarbons presents serious environmental problems. Specifically, polyvinyl chloride is contained in refuse in substantial amounts. These products cannot be incinerated as such, inasmuch as volatile, possibly toxic, compounds will then be formed. A possible solution was thought to be incineration of this type of refuse on board special incinerating ships in the open sea, and the resulting volatile halogen compounds would ultimately be dissolved largely in the sea water. But this is undesirable for environmental reasons, and the costs are rather high. It is also possible to remove the halogen compounds from the vent gases of the incinerator by means of special and expensive methods, but disposal of the removed halogen compounds itself presents difficulties. Furthermore, in view of the increasing shortage of raw materials, such a process is less attractive. It is more desirable to process this refuse into useful products.

Problems also arise in processing used metal, such as motorcar scrap, tin cans, cables, and the like, whether or not in the presence of halogenated hydrocarbons. These problems arise because the conventional processing methods generally result in a strong reduction in value of the material due to a loss in quality of the metal during processing. For instance, in the case of copper cables coated with polyvinyl chloride, the quality of the copper strongly falls when the cables are put in an incinerator. Moreover, many copper cables are coated with tin, and the tin diffuses into the copper at the temperatures prevailing in an incinerator, resulting in a reduction in the value of the copper.

A similar problem is encountered in processing tin cans (tin-plated iron). A major part of the tin diffuses into the iron under the incineration conditions. This requires expensive steps to render the iron suitable again for meticulous uses. However, these steps make it less attractive to recover iron from waste containing tin. A further problem that arises in processing waste materials is the environmental pollution caused by heavy metals often contained in the residues. These include, for instance, lead, antimony, and cadmium.

The object of the invention is to provide a process in which said waste products are processed in a simple and efficient way without attendant environmental problems, while also one or more valuable products can be recovered in a very pure form.

SUMMARY OF THE INVENTION

According to the present invention, waste containing halogenated hydrocarbons is pyrolyzed in the absence of oxygen to produce a hydrogen halide containing gas. Used metal and/or metal scrap is also heated to elevated temperatures, and the hydrogen halide gas is maintained in contact with the heated metal under conditions whereby at least a portion of the metal is converted to a volatile metal halogenide. The volatile metal halogenides are largely separated from the gaseous mixture formed, and at least a portion of the remaining gaseous mixture and/or the hydrocarbon residue from the pyrolysis step, is used as a fuel to maintain the elevated temperatures.

The quantity and content of the waste metal component, and the temperature applied, are selected so as to convert substantially all of the hydrogen halide content of the gas into a metal halogenide. Most generally, it is preferred to apply a temperature at which the metal halogenide is a vapor, and it can be simply removed from the resulting gas by condensation. Under certain circumstances, however, it may be preferable to not increase the temperature above the metal halogenide vaporization point in which event it may be removed from the remaining waste metal by washing. The conditions may also be adjusted to insure that heavy metals that may be present in the waste are converted to the corresponding metal halogenide. In this manner, according to the present invention, it has been found possible to substantially reduce the halogen and heavy metal content of solid residues and gases discharged to the environment as compared to known waste disposal processes.

The process according to the invention is also notably suitable for selectively separating certain metal components of the waste metal from one another by selective conversion of such component to the metal halogenide. Specifically, surface coatings can be removed from used metals and metal scrap, such as tin-plated iron (tin cans), tin-plated, or cadmium-plated copper or chromium-plated metal. The process according to the invention may also be used for treating alloys, when one or more of the component metals are recovered as the halogenide.

This process is also very suitable for upgrading metal scrap. Notably, it is possible to remove the tin from tin-plated copper or iron, while the copper and/or iron are retained in the slag or residue as virtually pure metals, which can be separated from the residue in a simple way.

DETAILED DESCRIPTIONS OF THE INVENTION

In one embodiment of this process, the metal scrap and the halogenated hydrocarbons are both introduced into a pyrolysis zone or chamber wherein they are heated together, in the virtual absence of molecular oxygen, to temperatures in the range of between about 250° to 1500° C. Hydrogen halide gas is liberated which in turn selectively reacts, depending on the conditions chosen, with one or more of the metal components present in the waste to form a volatile metal halogenide. The metal halogenide can thereafter be recovered by condensation or other suitable means from the gas mixture leaving the pyrolysis zone. This gas mixture additionally contains a significant quantity of combustible hydrocarbon gas resulting from pyrolysis of the hydrocarbon waste, which can be burned, after removal of the metal halogenides, to supply at least a portion of the heat required for the pyrolysis zone.

In practicing this embodiment, it is essential that measures be taken to maintain the hydrogen halide in contact with the metal component until the metal reaches a sufficiently high temperature to effectively convert a component of the metal waste into the metal halogenide. This requirement arises because, as the halogenated hydrocarbons are heated, the hydrogen halide is released at relatively low temperatures, for instance, in the range of between about 300° to 350° C. in the case of PVC. On the other hand, substantially higher temperatures, for instance over 500° C., are required for the halogenation of the metal component to proceed at a sufficient rate.

In conventional apparatus, it is possible for the hydrogen halide gas to be released and to leave the pyrolysis zone before the metal component is heated to a sufficiently high temperature for the halogenation reaction to proceed to any appreciable extent. This difficulty can be overcome by using apparatus wherein, for example, the waste material and metal scrap enter one end of a pyrolysis chamber and are heated while being conveyed to the exit end of the chamber. The hydrogen halide containing gas initially given off is maintained in the chamber and directed through the chamber co-currently with the scrap metal, and maintained in contact therewith until after the appropriate halogenation temperature is reached. The hydrogen halide produced by the pyrolysis would then be substantially converted to the metal halogenide before exiting the chamber. Suitable apparatus for carrying out this embodiment would include an externally heated rotary kiln. After condensing out the metal halogenides, the remaining hydrocarbon gas is burned as fuel to heat the kiln, and any minor quantities of halogen or compounds thereof that might remain in the combustion products can be removed by simple scrubbing before the gas is released to the atmosphere.

Alternatively, in a batch process, two parallel reactors can be used so that the contents of one reactor are always at a temperature high enough for the reaction between the waste metal therein and the hydrogen halide given off during the heat-up period of the other reactor. Or a single reactor can be used and the hydrogen halide gas drawn off at relatively low temperatures during the heat-up period can be reintroduced after the waste metal in the reactor has reached a suitably high temperature for conversion into the metal halogenide.

In the above configuration where the waste metal and halogenated hydrocarbons are heated together in a single chamber, a large volume of hydrocarbon gases are produced at the high temperatures and mixed with the hydrogen halide before reaction with the metal waste. Thus, the metal halogenide vapor produced is quite dilute, and must be separated from a substantial volume of high temperature gas. Therefore, relatively large condensors are required to cool this volume of gas in order to condense and recover the metal halogenide.

This difficulty is overcome by a second embodiment wherein the waste metal and the halogenated hydrocarbon are treated separately. The halogenated hydrocarbon containing waste material is treated, separate from the scrap metal, in a pyrolysis zone or dehalogenator wherein it is heated in the absence of molecular oxygen to only a temperature sufficient to drive off the hydrogen halide, but not high enough to decompose the waste into hydrocarbon gases. For instance, in the case of polyvinyl chloride, a temperature in the range of from about 300° to 350° C. is sufficient to drive off the hydrogen halide gas. The hydrogen halide gas can be separately developed in, for instance, a fluidized bed reactor. The remaining hydrocarbon residue is then introduced into a combustion chamber wherein it is burned to provide heat to bring the waste metal up to a sufficient temperature to be converted to a metal halogenide. Preferably, the hydrocarbon residue is burned in less air than required for complete combustion, so as to produce a hot reducing gas which is then used to directly heat the waste metal in a heating chamber. The waste metal so heated is then contacted in a halogenation chamber with the hydrogen halide gas from the dehalogenator or pyrolysis zone. The resulting metal halogenide vapor is removed from the halogenation chamber in a gas mixture also containing any residual unreacted hydrogen halide gas.

The metal halogenide is condensed from the gas mixture leaving the halogenation chamber and is in suitable form for subsequent use or processing. Any hydrogen halide remaining in the residual gas can be absorbed prior to releasing the residual gas to the atmosphere. Alternatively, the remaining hydrogen halide can be taken up by contacting it with the additional quantity of a suitable heated metal component.

The residual waste metal is removed from the halogenation chamber and preferably washed in recirculating water in order to remove any remaining metal halogenide that might be clinging to the surface. This metal halogenide can be recovered from the water and utilized in further processing together with the metal halogenide condensed out of the gas stream. The remaining residual waste metal, after washing, is then in condition for further processing into useful products.

The advantage of this preferred embodiment is at least twofold. First of all, the halogenated hydrocarbon containing scrap need only be heated to a sufficient temperature to drive off the hydrogen halide, as opposed to being fully pyrolyzed and decomposed into gaseous hydrocarbons. The resulting hydrogen halide gas used to halogenate the waste metal is thus far more concentrated than in the first embodiment, and the metal halogenide containing gas mixture leaving the halogenation chamber is far more concentrated with respect to the metal halogenide. Thus, far less heat need be removed in the condensors to condense and recover the metal halogenide.

Secondly, this embodiment utilizes the dehalogenated hydrocarbon residue as a fuel, and directly utilizes the hot gases resulting therefrom to bring the scrap metal up to the appropriate chlorination temperature while maintaining a reducing atmosphere. The remaining fuel value of the off gas is leaving the heating chamber may thereafter be utilized in an after-burner, and the hot gases resulting therefrom used to heat the combustion air used for the combustion chamber.

This second embodiment is particularly useful for processing tin cans to remove the tin and lead therefrom, utilizing polyvinyl chloride containing hydrocarbon waste material. The tin cans can be supplied to the process unshreaded, shredded, or bailed, and this has not been found to affect the detinning results.

In a third embodiment, particularly adapted for the treatment of copper cables, the cables are cut in pieces of, for example, one-half meter in length and fed into a reactor wherein they are directly heated up to a temperature of approximately 500° C. on a reciprocating grate such as described in German Pat. No. 2,364,660. As the temperature rises to 300°–350° C., the PVC insulation is dechlorinated and the brittle hydrocarbon residue is removed from the copper wire and fed into a combustion chamber wherein it is burned to provide the heat in the reactor. As the temperature of the copper cable rises up to about 500° C., the hydrogen chloride gas which has been driven from the PVC insulation reacts with the tin on a cable to form $SnCl_2$. The detinned copper cable is then dropped into recirculating water wherein any residual $SnCl_2$ is washed from the surface and the thus purified copper cable is prepared for further processing.

Any residual hydrogen halide and heat contained in the off gas from the reactor, as well as residual heat in the off gas from the combustion chamber, may be utilized to heat and halogenate further amounts of scrap metal, such as tin cans, in a separate chamber.

In a fourth embodiment, the copper cables can be cooled with liquid nitrogen so the insulation becomes brittle. This cooled material is fed into a shredder so that the copper and insulation are loosened from each other, and the mixture of copper and granulated plastics and rubber is separated by known mechanical methods. The copper is fed into a detinning reactor wherein it is heated to approximately 500° C. The waste plastic is fed into a chlorinator wherein hydrogen chloride is released at a temperature of between about 300° to 350° C., and used for the detinning of the copper. The remaining hydrocarbon residue can be used for fuel to heat the copper up to the requisite chlorination temperature.

A number of variations and additions to the various embodiments discussed above are possible and within the scope of this invention. For instance, it may be desirable to remove hydrocarbon tar that may be produced in the dehalogenation or dechlorination zones prior to introducing the resulting hydrogen halide into the halogenation chamber. This tar may advantageously be used, particularly in the detinning of tin cans, to coat the surface of the water in which the purified tin cans are ultimately washed. In this manner, the amount of water vapor given off can be reduced, resulting in a reduction of the oxidation of the iron. Additionally, the hydrocarbon gas given off as the hot metal passes through the tar layer can itself be utilized as fuel for bringing additional quantities of scrap metal up to the appropriate temperature.

In the event that the amount of hydrogen halide produced at any moment of time is in excess of that required for converting the metal component to its corresponding metal halogenide, this hydrogen halide can be absorbed and stored for later introduction into the halogenation zone when required.

Of the metals halides most eligible for recovery, the chlorides usually have widely different boiling points. It is, therefore, quite possible to separately remove these metal chlorides from the gaseous mixture by "fractional" cooling. This means that the entire gaseous mixture is cooled in a first step to a temperature ranging between the boiling point of the highest-boiling chloride in the gaseous mixture and that of the highest-boiling chloride but one, and the liquefied or solidified metal chloride is separated off. On the other hand, the temperature of the halogenation step may also be raised stepwise so that a gaseous mixture is obtained that contains only one metal chloride. If use is made of a mixture of two metals only, such as tincoated copper cables or unsoldered tin cans, it is possible to recover only one of the metals as the chloride and to separate the other from the residue, such as, e.g. by means of a cyclone in which the separation is effected according to specific gravity. If the waste metal contains three or more different metal components, the halogenation can be carried out at a first temperature level whereby one metal halogenide vapor is formed and removed, and then raised to a second temperature level for the formation and removal of a second halogenide and so on.

The pyrolysis of the present invention contrasts with roasting as described in German Pat. application No. 2,316,318, in which molecular oxygen (from the air) is present throughout the process. The presence of oxygen makes it difficult, or even impossible, to obtain a gaseous mixture containing one metal chloride only, in that the metals are attacked randomly by the chlorine compounds produced. With the pyrolysis used in the present invention, however, it is possible so to choose the conditions such that only one metal reacts with the hydrogen halide to form a volatile metal halogenide, while the other metal components remain in the residue. The reason for this significant difference is probably that in roasting, a large part of the halogen compounds react with the metals in the form of $Cl_2$ (in the case of chlorinated hydrocarbons), which reaction is not preferential. In pyrolysis virtually only hydrogen halogenides are formed, which do react preferentially with given metals.

Suitable halogenated hydrocarbons include especially all chlorinated hydrocarbons, and in particular, polymers containing chlorine, such as polyvinyl chloride, chlorinated polythene, and furthermore all kinds of mixtures of hydrocarbons containing chlorine, such as the by-products from the preparation of vinyl chloride or herbicides. Polymers containing fluorine, such as polytetrafluoroethylene, are also highly suitable.

The used metal and/or metal scrap, whether or not mixed with non-metallic refuse, may come from a so-called car-shredder or the metal fraction of household refuse, whether or not after treatment in an incinerator. Other waste materials that can be advantageously processed by the present invention are metal cables, metal cans, electric cables, exhausted lead accumulators, car radiators, and obsolete electronic equipment. The process is particularly suitable for the recovery of metals or metal halogenides from exhausted catalysts or hydroxide sludge from galvanizing industries. This process can also be used to process the combustion dust and/or the metallic fraction of a conventional incinerator into pure metals and/or metal chlorides. In general, any type of used metal and/or metal scrap is suitable, provided one or more of the metals present form chlorides that are volatile at higher temperatures.

The metal need not be contained in the scrap as the element. The process according to the invention is also suitable to recover metal that is fully or partially oxidized. This process can also be used to purify used metals, such as the removal of lead from tin or bismuth, zinc from tin, magnesium from aluminum, and the like.

The separation of a mixture of metals is mainly made possible by differences in thermodynamic stability and differences in vapor pressures of the formed halides. Data on thermodynamic stability and vapor pressure of halides, specifically chlorides, are well known from various handbooks and publications. See, e.g., H. H. Kellogg, "Thermodynamic Relationships in Chlorine Metallurgy", Transactions AIME Vol. 188, June 1950, Journal of Metals at pages 862–872. See also, O. Kubachewsky, E. L. Evans, Vol. 1, Metallurgical Thermochemistry, Pergamon Press, 1965.

Looking, for example, at the separation of tin from tinned copper cables, it can be seen from thermodynamic data that $SnCl_2$ is much more stable than $Cu_2Cl_2$. Using hydrogen chloride gas, $Cu_2Cl_2$ can only be formed below temperatures of about 400° C., but the rate of reaction is very low at this temperature. On the other hand, with hydrogen chloride, $SnCl_2$ can be formed at temperatures up to about 1400° C. At a temperature of 625° C., the vapor pressure of $SnCl_2$ is one atmosphere (760 mmHg), whereas the vapor pressure of $Cu_2Cl_2$ formed at this temperature is only about 4 mmHg. Furthermore, the formation of $Cu_2Cl_2$ is not possible in the presence of Sn because of the much higher thermodynamic stability of $SnCl_2$ over $Cu_2Cl_2$.

In the case of tin plate, the preferential removal of the tin from the iron is based on the difference in vapor pressure between $SnCl_2$ and $FeCl_2$, whereas the thermodynamic stabilities of $SnCl_2$ and $FeCl_2$ are about the same when hydrogen chloride is utilized. Thus, at 623° C., the vapor pressure of $SnCl_2$ is 760 mmHg, and the vapor pressure of $FeCl_2$ is 0. By comparison, in the presence of chlorine, $FeCl_3$ can be formed with a much higher vapor pressure than $SnCl_2$ so that selective removal of tin is no longer possible.

Another consideration when removing tin from iron is that especially in the presence of water vapor, which cannot be avoided during pyrolysis, attack on the iron will be considerable. Therefore, for preferential removal of tin from iron, temperatures of 550° C. and higher will be sufficient, but it is advisable to maintain the temperature below about 700° C. in order to prevent high iron losses. Preferably, a temperature of about 650° C. is used.

A phenomenon that cannot be predicted by means of thermodynamic data is the possibility of removing tin out of the seams of tin cans by means of the present process. It has thus been learned from experiments that, when treated in accordance with the present invention, tin even contained in the seams will disappear as volatile $SnCl_2$.

Another consideration with respect to removal of tin plate from tin cans is that, once they have passed through an incinerator, almost all of the tin still present has gone into a solid solution in the iron surface to depths of 25 $\mu$m or more. However, it has been found that, when treated in accordance with the present invention, the tin diffuses out of the iron and again is removed as volatile $SnCl_2$. In order to facilitate this diffusion, temperatures above 750° C. and higher are advisable even though some iron losses cannot be prevented at these higher temperatures. No other process is known whereby tin can be removed out of the seams of tin cans and/or out of solid solution.

The additional presence of lead does not disturb the detinning of iron under the present process. $PbCl_2$ has a slightly higher thermodynamic stability than $SnCl_2$ and $FeCl_2$. However, the vapor pressure of $PbCl_2$ is considerably lower than the vapor pressure of $SnCl_2$, but somewhat higher than the vapor pressure $FeCl_2$. Therefore, to remove the lead as a volatile $PbCl_2$, the temperature has to be raised up to about 800° C. However, formation of liquid $PbCl_2$ will already take place even at considerably lower temperatures so it can be washed away with hot water. Thus, at temperatures of 700° C., sufficient $PbCl_2$ can be formed to remove most of the lead from soldered seams of tin cans. Moreover, the presence of lead on detinned iron does not deteriorate the quality of the ferrous scrap in the same manner as would the presence of tin or copper.

Zinc can also be removed from iron by the present process. Thus, up to a temperature of about 1900° C., $ZnCl_2$ is considerably more stable than $FeCl_2$. Moreover, $ZnCl_2$ is more volatile than $FeCl_2$. Up to temperatures of about 670° C., the vapor pressure of $FeCl_2$ is almost 0, whereas the vapor pressure of $ZnCl_2$ is almost 400 mmHg. At 732° C., the vapor pressure of $ZnCl_2$ is one atmosphere so that at temperatures of about 650° C. and higher, relatively fast dezincing of iron can take place.

Chrome can also be removed from copper. The thermodynamic stability of $CrCl_2$ is very high in comparison with $Cu_2Cl_2$. Moreover, $Cu_2Cl_2$ cannot be formed with hydrogen chloride above a temperature of about 400° C. However, the melting point of $CrCl_2$ is 815° C., and at 900° C., the vapor pressure of $CrCl_2$ is only about 3 mmHg. Therefore, the formed $CrCl_2$ cannot be effectively removed by vaporization, but has to be removed with water.

The above illustrates how the present process can be utilized to effectively separate a number of metal combinations by application of appropriate thermodynamic stability and vapor pressure data for the metals involved. The process can similarly be applied to combinations of metal components other than those listed above, and is thus not limited thereto.

After the metal halogenides have been condensed and separated from the gas mixture leaving the halogenation reaction, the remaining gases, which mainly consist of hydrocarbons, whether or not aromatic, are combustible and are used as a fuel to maintain the pyrolysis reaction. Depending upon the starting products, the hydrocarbons may consist partly of aromatic compounds, such as benzene, toluene, naphthenes, and the like. These hydrocarbons furthermore contain, inter alia, volatile alkanes and alkenes. In a preferable embodiment of the process according to the invention, these aromatic hydrocarbons are first separated from the gaseous mixture before burned as a fuel.

In some cases the pyrolysis of the halogenated hydrocarbons does not produce sufficient fuel to maintain the pyrolysis temperature. Additional fuel can then be obtained by pyrolysis of non-halogenated products, such as car tires, polyolefin waste, paper, wood, etc. This pyrolysis may be effected in the same furnace as the pyrolysis of the halogenated hydrocarbons, but it may also be effected in a separate furnace.

In principle, atmospheric pressure is used during the pyrolysis, but use may also be made of reduced or elevated pressure.

The metal halogenides recovered from the condensor can be used as such, or may be reduced to the pure metal form. For example, the reduction of $SnCl_2$ is described by J. D. Esdaile and G. W. Walters in Trans. Inst. Min. Met., 83 (1974) pp C-59. According to that method, condensed stannous chloride is briquetted with limestone and carbon, and reduced by heating to a temperature between about 920° and 980° C. in covered crucibles to produce liquid calcium chloride and tin metal.

Other means of reducing metal halogenides to metals include reduction by electrolysis and reduction by means of methane, hydrogen, or other metals as described by H. H. Kellogg, "Thermodynamic Relationships in Chlorine Metallurgy" in Transactions AIME, Vol. 188, June 1950, Journal of Metals, pages 862–872.

In this process, hardly any noxious gases are released in the environment inasmuch as substantially all of the gases released in the pyrolysis or halogenation steps are either burned or condensed. If minor amounts of halogen compounds are still contained in the gases used as fuel for the pyrolysis, they can be removed from the vent gases of the combustion in a simple manner, such as by treating them with an oxide of an alkali earth metal, preferably CaO. Alternatively, any residual hydrogen halide can be directly used, or absorbed and stored for later use, in the halogenation of additional amounts of waste metals such as non-ferrous metals. Preferably, all of the halide will be converted to the metal halogenide leaving non-detectable amounts to be discharged to the atmosphere or otherwise absorbed for disposal.

To obtain efficient separation of a selected metal component from the waste metal, the amount of hydrogen halide used for the halogenation should be in the range of about 1.2 to 10 times the stoichiometric quantity required for the formation of the desired metal halogenide. An amount of HCl approximately 1.5 times the stoichiometric quantity required had been found particularly suitable, especially in detinning tin plated scrap. In order to tie up the excess hydrogen halide, it is necessary to adjust the halogenation conditions so that other components of the waste metal, for instance the iron in the case of tin plated iron, are converted into their metal halogenide. Thus, a disadvantage of using a larger excess of hydrogen halide is that a greater quantity of the metal component that is intended to remain behind in the residue is attacked. Alternatively, other non-ferrous metals can be intentionally added in sufficient quantities to tie up the excess hydrogen halide as a metal halogenide, in order to minimize the ultimate release of halide compounds to the atmosphere.

By way of example, typical household garbage in the Netherlands contain about 3 percent tin cans with a tin content of about 0.5 percent. Approximately 0.1 percent of the garbage consist of polyvinyl chloride. Thus, more hydrogen chloride will be produced than can be tied up by the tin alone. However, by utilizing higher temperatures and longer residence time during the halogenation reaction, also a portion of the iron will be converted to $FeCl_2$ so that substantially all of the hydrogen chloride is tied up as a metal halogenide. Alternatively, lower halogenation temperatures can be used if other suitable scrap metals are added to take up the excess hydrogen halides.

Another type of waste to which the present invention is ideally suited is the non-metallic waste from shredded automobiles. Depending upon the way in which non-ferrous metals are separated from the waste, a certain amount of non-ferrous metals, such as zinc, aluminum, and copper remains in the non-metallic waste. Because of the presence of small amounts of lead, antimony, and cadmium, remaining in this waste, and its polyvinyl chloride content averaging about 2.5 percent, neither landfill nor incineration are advisable, and in some localities would not be permitted. By treating this mixed waste material by the process of the present invention, it is possible to tie up the heavy metal and other metal components of the waste material with the halogen chloride produced by pyrolysis of the polyvinyl chloride, and to remove the surplus of HCl from the remaining gases in, for instance, a separate bed of non-ferrous metals which have been heated to the halogenation temperature with the hot pyrolysis gases.

DETAILED DESCRIPTION OF THE DRAWINGS

Figure 1:
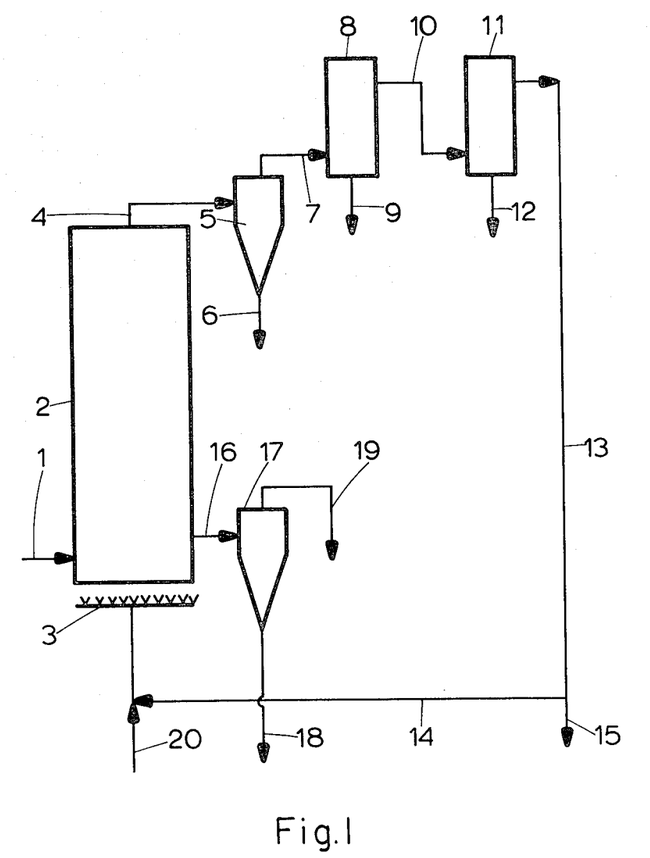
FIG. 1 is a schematic illustration of the basic process according to the invention wherein the waste metal and halogenated hydrocarbon are treated simultaneously in a single reactor.

Referring to FIG. 1, waste metal and halogenated hydrocarbons are fed separately or together to the pyrolysis reactor 2 through conduit 1. Molecular oxygen is excluded by means of, for example use of a nitrogen atmosphere. The reactor is heated by means of burners 3 to a temperature sufficient to pyrolyze the halogenated hydrocarbon into hydrogen halide and gaseous hydrocarbons, and to convert at least a portion of the metal into vaporous metal halogenides. A gaseous mixture formed in the reactor is passed through conduit 4 to cyclone 5 wherein the gaseous mixture is freed of any entrained dust particles. These dust particles are discharged through conduit 6. The gaseous mixture is then passed through conduit 7 to a first condensor 8, wherein one or more metal halogenides are separated off by cooling and discharged through conduit 9. The remaining gaseous mixture is fed through conduit 10 to a second condenser 11, where, again, one or more metal halogenides are separated off by cooling and discharged through conduit 12.

The remaining gaseous mixture containing gaseous hydrocarbons and now substantially freed of metal halogenides is passed through conduits 13 and 14 to be used as fuel in burners 3 of the pyrolysis reactor. If so desired, part of the gaseous mixture may be discharged through conduit 15 in order to be used for other purposes. Any shortage of fuel, notably at the start of the pyrolysis, is made up through conduit 20.

A solid mass is discharged from the pyrolysis reactor through conduit 16 and fed to cyclone 17. This solid mass will consist largely of inorganic filler contained in the pyrolysed halogenated hydrocarbons. Metals may also be present depending upon the reactor conditions and the composition of the feed. These metals are separated from the inorganic filler in cyclone 17. The fraction with the higher specific gravity is discharged through conduit 18 and the other fraction through conduit 19. It is also possible to effect this separation in various steps, and a separation can be effected according to particle size, if the composition of the solid mass so permits.

Figure 2:
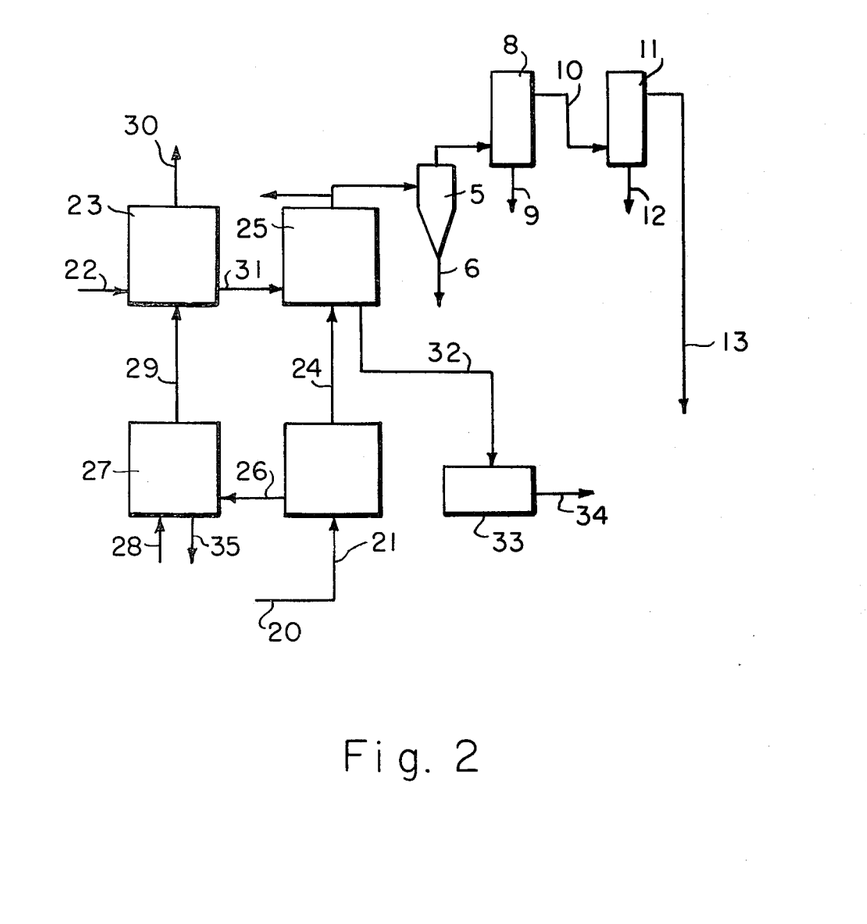
FIG. 2 schematically illustrates preferred embodiment wherein the halogenated waste is first separately dehalogenated to produce hydrogen halide and the resulting hydrocarbon residue is combusted to heat the metallic waste to the requisite halogenation temperature.

Referring to FIG. 2, the corresponding reference numerals thereon have the same meaning as in FIG. 1. However, in this embodiment, rather than feeding the waste metal and the waste halogenated hydrocarbon into a single pyrolysis reactor, the waste halogenated hydrocarbon is fed through conduit 20 into dehalogenation zone 21, and the waste metal is separately fed through conduit 22 into heating zone 23.

In dehalogenation zone 21, the waste halogenated hydrocarbons are heated to a temperature sufficient to drive off hydrogen halide, but not so high as to cause substantial decomposition of the waste material into gaseous hydrocarbons. The hydrogen halide so produced is passed through conduit 24 into halogenation zone 25. The residual waste hydrocarbon from dehalogenation zone 21 is fed via conduit 26 into combustion zone 27 wherein it is burned with less than a stoichiometric quantity of air introduced through conduit 28 to form a hot reducing gas. This hot reducing gas is passed through conduit 29 into heating zone 23 wherein it is used to directly heat the waste metal to a suitable temperature for halogenation. The reducing gas leaves heating zone 22 through conduit 30, and can be led, for instance, to an after burner (not shown) and the further heat can be used to heat the combustion air in line 28.

From heating zone 23, the hot waste metal is conveyed via line 31 to halogenation zone 25 wherein it is contacted with hydrogen halide and at least a portion is converted into the metal halogenide vapor. The resulting gas containing the metal halogenide is withdrawn from halogenation zone 25 via conduit 4, and is thereafter condensed and separated as in FIG. 1. However, this metal halogenide gas is significantly more concentrated than in the embodiment of FIG. 1.

The residual waste metal component is withdrawn from halogenation zone 25 through conduit 32 and washed in washing tank 33 of any metal halogenide still clinging to the surface. The washed residual metal is discharged through conduit 34 and is in a condition for further processing. The residue remaining after dehalogenation and combustion of the waste halogenated hydrocarbon is discharged from combustion zone 27 via line 35, and consists primarily of inorganic fillers that had been added to the halogenated hydrocarbons.

The invention will now be further elucidated with reference to the following examples.

EXAMPLE I 2 tons/h of PVC waste consisting of 78 percent by weight of PVC, 20 percent by weight of filler (CaO, MgO), and 2 percent by weight of stabilizers (organic Pb, Cd, Sn compounds) and 2 tons/h of metal scrap in the form of tin-plated copper wire consisting of 99.6 percent by weight of Cu, 0.4 percent of Sn are fed to a reactor 2 of an installation of the type substantially described in FIG. 1. This reactor is fired with a fuel coming, at least in part, from the pyrolysis of halogenated hydrocarbons. The temperature in the reactor is 450° C. and the absolute pressure 1 kg/cm². The average retention time in the reactor is 15 minutes. 500 m³ (N.T.P.) of a gas consisting of 40 percent by weight of non-aromatic hydrocarbons, 50 percent bij weight of aromatic hydrocarbons, and 10 percent bij weight of chlorides of Sn and Cu escape through conduit 4, cyclone 5, and conduit 7. In condensor 8 the temperature of the gas is lowered to about 300° C. by indirect cooling with air. $SnCl_2$ then condenses and is discharged through conduit 9. In condensor 11 cooling to 25° C. is effected in the same way. Benzene then condenses and is discharged through conduit 12. Eventually about 200 m³ (N.T.P.) of gas from the pyrolysis containing less than about 50 mg. chlorides per cubic meter and non-detectable amount of hydrogen halides are passed to the burners. If too little fuel gas is supplied by the pyrolysis of the chlorinated higher hydrocarbons, additional unchlorinated hydrocarbons may, if necessary, be fed to the reactor, such as polythene, polypropene, polystyrene wastes, etc. Another possibility is to use as fuel hydrocarbons from the separate pyrolysis of this waste or, e.g., from the pyrolysis of car tires (if so desired, after removal of volatile metal compounds).

2.4 tons/h of solids are discharged from the reactor. These are separated into a 1.9 tons/h fraction consisting substantially of metals and into a 0.5 ton/h fraction mainly consisting of inorganic metal salts, predominantly $CaCl_2$. This fraction may be processed further, e.g., into filler material.

EXAMPLES II THROUGH VII

A number of experiments were carried out in a laboratory set-up consisting of a quartz tube and a tubular furnace. In these experiments the time, temperature, and the composition of the metal scrap were varied. The pressure was atmospheric, while any molecular oxygen was removed by means of nitrogen prior to the start of the pyrolysis. Hydrogen chloride for effecting the halogenation was derived from the pyrolysis of PVC.

The table states successively the composition of the metal scrap, the residence time and temperature in the reactor, and the composition of the solid mass after pyrolysis.

| example | metal scrap | time minutes | temp. °C. | composition of solid, % by w. |
|---|---|---|---|---|
| II | zinc-plated steel 0.5% of Zn | 15 | 550 | 0.002 Zn remainder Fe |
| III | tin-coated copper cable 0.36% of Sn | 15 | 450 | 0.02 Sn |
| IV | tin cans 0.9% of Sn | 10 | 550 | 0.02 Sn remainder Fe |
| V | tin cans with lead solder 1.54% Sn 1.52% Pb | 15 | 800 | 0.02 Sn 0.1 Pb remainder Fe |
| VI | tin cans from incinerator (without seams) 0.49% of Sn | 5 | 750 | 0.006 Sn remainder Fe |
| VII | ditto with lead solder (with folded seams) 0.63% of Sn 4.28% of Pb | 1 | 800 | 0.033 Sn 0.055 Pb |

This table shows that it is possible to treat both metal scrap and halogenated hydrocarbons in one process in which the remaining solid mass can simply be separated into a metal fraction with very little foreign matter. Moreover, hardly any losses occurred in the examples II through VII. This means that hardly anything of the metal retained in the solid mass volatilized in the form of chlorides.

EXAMPLE IX AND X

The experiment according to example III was effected, while the polyvinyl chloride was replaced by polytetrafluoroethylene and waste from the bromination of benzene, respectively. Comparable results were obtained.

What is claimed is:

1. A process for the disposal of waste material containing halogenated hydrocarbon by pyrolysis in the absence of molecular oxygen by the combination of steps of:
   introducing said waste halogenated hydrocarbon into a pyrolysis zone wherein it is heated to a temperature at least sufficient to form a pyrolysis zone off-gas containing halide substantially all in the form of gaseous hydrogen halide, and a pyrolysis zone residue;

introducing waste metal into a heating zone wherein it is heated to a halogenation temperature whereat at least one component of said waste metal will react with said hydrogen halide to form the corresponding metal halogenide;

contacting said heated waste metal in a halogenation zone, which is separate from said pyrolysis zone, with said hydrogen halide containing pyrolysis zone off-gas whereby at least a portion of said waste metal is converted into at least one metal halogenide which is vaporized under the temperature applied, thereby forming a metal halogenide containing gas;

separating metal halogenide by condensation from said metal halogenide containing gas leaving a residual gas stream; and utilizing at least a portion of the fuel value of said halogenated hydrocarbon to provide heat to at least one of said zones;

wherein the composition, quantity, and temperature of said heated waste metal in said halogenation zone is chosen so as to convert substantially all of said gaseous hydrogen halide into metal halogenide.

2. The process of claim 1 wherein said halogenated hydrocarbon is heated in said pyrolysis zone to a temperature sufficient to additionally decompose said halogenated hydrocarbon into gaseous hydrocarbons, and said gaseous hydrocarbons are burned to provide heat to at least one of said zones.

3. The process of claim 1 wherein said halogenated hydrocarbon component is heated in said pyrolysis zone to a temperature of at most about 350° C. to drive off the hydrogen halide, and the remaining pyrolysis zone residue is removed from said pyrolysis zone and burned to provide heat to at least one of said zones.

4. The process of claim 3 wherein said pyrolysis zone residue is burned so as to produce a hot reducing gas which is introduced into said heating zone to directly heat said waste metal.

5. A process for the disposal of waste material containing halogenated hydrocarbons by pyrolysis in the absence of molecular oxygen by the combination of steps of:

introducing said waste halogenated hydrocarbon into a pyrolysis zone wherein it is heated to a temperature at least sufficient to form a pyrolysis zone off-gas containing halide substantially all in the form of gaseous hydrogen halide, and a pyrolysis zone residue;

introducing waste metal into a heating zone wherein it is heated to a halogenation temperature whereat at least one component of said waste metal will react with said hydrogen halide to form the corresponding metal halogenide;

contacting said heated waste metal in a halogenation zone, which is separate from said pyrolysis zone, with said hydrogen halide containing pyrolysis zone off-gas whereby at least a portion of said waste metal is converted into at least one metal halogenide which is vaporized under the temperature applied, thereby forming a metal halogenide containing gas;

separating metal halogenide by condensation from said metal halogenide containing gas leaving a residual gas stream;

utilizing at least a portion of the fuel value of said halogenated hydrocarbon to provide heat to at least one of said zones;

wherein any hydrogen halide still contained in said residual gas sream is utilized for the halogenation of a further amount of waste metal to metal halogenide.

6. The process of claim 5 wherein said hydrogen halide still contained in said residual gas stream is absorbed and retained for subsequent use for the halogenation of a further amount of waste metal to metal halogenide.

7. A process for the disposal of waste material containing halogenated hydrocarbon by pyrolysis in the absence of molecular oxygen by the combination of steps of:

introducing said waste halogenated hydrocarbon into a pyrolysis zone wherein it is heated to a temperature at least sufficient to decompose said halogenated hydrocarbon to form a pyrolysis gas containing halide, substantially all in the form of gaseous hydrogen halide, together with a combustible hydrocarbon gas;

introducing waste metal into said pyrolysis zone wherein it is heated, together with said halogenated hydrocarbon, to a temperature whereat at least one component of said waste metal will react with said hydrogen halide to form the corresponding metal halogenide;

contacting said heated waste metal in said pyrolysis zone with said hydrogen halide containing pyrolysis gas in a manner such that substantially all of said hydrogen halide and at least a portion of said waste metal is converted into at least one metal halogenide which is vaporized under the temperature applied;

removing from said pyrolysis zone a gas stream containing said metal halogenide and said combustible gas, and separating metal halogenide therefrom by condensation leaving a residual gas stream containing said combustible gas; and utilizing at least a portion of said residual gas stream to provide heat to said pyrolysis zone.

8. The process of claim 7 wherein said heated waste metal is initially comprised of at least two metal components and is heated to a first temperature whereat one of said metal components is selectively converted to a first metal halogenide in preference to the remainder of said metal components, and said first metal halogenide is condensed and separated from the metal halogenide containing gas.

9. The process of claim 8 wherein said heated waste metal is initially comprised of at least three metal components, and the remainder of said metal components is thereafter heated to a second temperature whereat a second of said metal components is selectively converted to a second metal halogenide, and said second metal halogenide is condensed and separated from the metal halogenide gas separately from said first metal halogenide.

10. The process of claim 7 wherein said heated waste metal is initially comprised of a plurality of metal components and is heated to a temperature whereat at least two of said metal components are converted to their respective metal halogenides, and said metal halogenide containing gas is cooled to a first condensation temperature whereat a first metal halogenide is selectively condensed and separated leaving a remaining metal halogenide containing gas, and said remaining gas is further cooled to a second condensation temperature whereat a second metal halogenide is selectively condensed and separated from said remaining gas.

11. The process of claim 7 wherein any minor amount of hydrogen halide remaining in said residual gas stream is removed by absorption.

12. A process for the disposal of waste material containing halogenated hydrocarbon by pyrolysis in the absence of molecular oxygen by the combination of steps of:

introducing said waste halogenated hydrocarbon into a pyrolysis chamber wherein said halogenated hydrocarbon is conveyed from its point of introduction to an exit therefrom while being heated to a temperature at least sufficient to decompose said halogenated hydrocarbon to form a pyrolysis gas containing halide, substantially all in the form of gaseous hydrogen halide, together with a combustible hydrocarbon gas;

introducing waste metal into said pyrolysis chamber wherein it is conveyed together with said halogenated hydrocarbon and heated to a halogenation temperature whereat at least one component of said waste metal will react with said hydrogen halide to form the corresponding metal halogenide;

directing said gaseous hydrogen halide through said pyrolysis chamber cocurrently and in contact with said waste metal while said waste metal is heated to said halogenation temperature and until substantially all of said hydrogen halide and at least a portion of said waste metal is converted into at least one metal halogenide which is vaporized under the temperature applied;

removing from said pyrolysis chamber a gas stream containing said metal halogenide and said combustible gas, and separating metal halogenide therefrom by condensation leaving a residual gas stream containing said combustible gas; and utilizing at least a portion of said residual gas stream to provide heat to said pyrolysis chamber.

13. The process of claim 12 wherein said pyrolysis chamber is a rotary kiln.

* * * * *